(12) United States Patent
Fuente et al.

(10) Patent No.: US 6,484,217 B1
(45) Date of Patent: Nov. 19, 2002

(54) MANAGING SHARED DEVICES IN A DATA PROCESSING SYSTEM

(75) Inventors: Carlos Francisco Fuente, Portsmouth (GB); Andrew Key, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/295,739

(22) Filed: Apr. 20, 1999

(51) Int. Cl.[7] .......................... G06F 12/00; G06F 13/00; G06F 13/14; G06F 13/22; G06F 13/38
(52) U.S. Cl. .............................. 710/15; 710/5; 710/6; 710/18; 710/19; 710/36; 710/37; 710/40; 710/62; 710/220; 710/244; 709/213; 709/214; 711/147; 711/150; 711/151; 714/2; 714/48; 714/55; 371/62
(58) Field of Search ................................. 709/201, 213, 709/214; 710/1, 5–7, 15, 18–20, 36, 37, 40, 44, 46–48, 58, 59, 62, 63, 107, 111, 118, 220, 240, 244, 260; 711/147, 150, 151, 158; 714/1, 2, 43, 44, 47, 48, 55, 56; 370/216, 236, 242; 371/48, 62

(56) References Cited

U.S. PATENT DOCUMENTS

| | | | | |
|---|---|---|---|---|
| 4,503,535 A | * | 3/1985 | Budde et al. .................. 371/11 |
| 5,388,254 A | * | 2/1995 | Betz et al. ..................... 714/16 |
| 5,530,872 A | * | 6/1996 | Smeltzer et al. ............. 710/260 |
| 5,613,076 A | * | 3/1997 | Latif et al. ................... 710/113 |
| 5,651,113 A | * | 7/1997 | Lin et al. ....................... 710/58 |
| 5,696,646 A | * | 12/1997 | Satoh ....................... 360/78.04 |
| 5,699,511 A | * | 12/1997 | Porcaro et al. .............. 709/224 |
| 5,754,887 A | * | 5/1998 | Damron et al. ................ 710/39 |
| 5,758,190 A | * | 5/1998 | Johnson et al. ................ 710/48 |
| 5,768,620 A | * | 6/1998 | Johnson et al. ................ 710/15 |
| 5,894,583 A | * | 4/1999 | Johnson et al. ................ 710/48 |
| 5,924,122 A | * | 7/1999 | Cardoza et al. ............. 711/150 |
| 5,935,218 A | * | 8/1999 | Beyda et al. ................ 709/251 |
| 5,978,939 A | * | 11/1999 | Mizoguchi et al. ........... 714/55 |
| 6,012,154 A | * | 1/2000 | Poisner .......................... 714/55 |
| 6,085,277 A | * | 7/2000 | Nordstrom et al. ......... 710/263 |
| 6,173,339 B1 | * | 1/2001 | Yorimitsu ....................... 710/5 |
| 6,223,244 B1 | * | 4/2001 | Downer et al. ............. 710/244 |
| 6,304,546 B1 | * | 10/2001 | Natarajan et al. ........... 370/216 |
| 6,353,845 B1 | * | 3/2002 | Torzewski et al. .......... 709/102 |

\* cited by examiner

*Primary Examiner*—Jeffrey Gaffin
*Assistant Examiner*—Tanh Q Nguyen
(74) *Attorney, Agent, or Firm*—Noreen A. Krall; Kunzler & Associates

(57) ABSTRACT

Disclosed is a method and device adapter for managing devices in a data processing system that includes a plurality of device adapters connected for independent communication with at least one shared device (e.g. disk data storage device). The method comprises the steps of: issuing a command from a first of the plurality of adapters to the at least one shared device; setting, in the first adapter, first and second timeouts associated with the command; on expiration of the first timeout value, issuing a message from said first adapter to other(s) of the plurality of adapters to request the other adapter(s) to notify the first adapter of any work requested of the shared device by the other adapter(s); and on expiration of the second timeout value, initiating a recovery operation in the data processing system.

35 Claims, 4 Drawing Sheets

MANAGING SHARED DEVICES IN A DATA PROCESSING SYSTEM

FIELD OF THE INVENTION

The present invention relates generally to the management of shared devices in a data processing system.

BACKGROUND OF THE INVENTION

In data processing systems, device adapters are used to control attached devices for use by a host computer. Such device adapters may be incorporated into the host computer (internal) or embodied as external device adapters. An example of a device adapter incorporated into a host computer is a device adapter board that may have associated device driver software. An example of a device adapter embodied as an external device adapter is an external device controller unit that is connected by a communication link to the host computer.

Device adapters are typically used to control storage and other peripheral devices, to interpret requests from the computer into a form suitable for use by the devices, and to interpret responses from the devices into a form suitable for use by the computer. Typically, devices such as disk are connected to a single adapter and are used by a single host computer. More recently, multi-adapter environments have been developed in which devices are connected to multiple adapters that, in the case of internal adapters, may exist in one or more host computers. In one known arrangement, one of the device adapters is nominated as a master adapter and all I/O operations to the devices are coordinated by the master adapter. This arrangement has the disadvantage of high workload at the master adapter. An alternative arrangement may therefore be used in ,which the multiple adapters are able to independently initiate I/O operations to the shared devices. For some types of I/O operations, for example, RAID 5 writes, this second arrangement requires the use of a locking technique to prevent corruption of data on the shared device.

In a multi-adapter environment where each adapter can independently initiate I/O operations to the shared devices, the adapters may place differing workloads upon the devices and knowledge regarding the sizes of the workloads may not be shared between the adapters. In this case, when one adapter sends work to a device, it has no knowledge of the amount of work other adapters may also have sent to the device. Hence it can be difficult to predict how long it will be until the work is actually dequeued by thee device and executed. Consequently, in this environment, it is difficult to handle timeouts effectively. If an adapter does not receive timely notification from a device that the work has been completed, it may assume that the device is dead and initiate a system reset. This assumption may however be erroneous as the delay may be due for example to the device processing work from another adapter. Thus command time-out values are difficult to set accurately. One solution to this problem would be to set long time-outs. However, this would delay recovery to an unacceptable degree when there is a genuine malfunction.

Another solution to this problem might involve each adapter being informed by the other adapters of all the commands they have sent to the shared device. Each adapter could use this information to build up an overall picture of activity at the shared device and set the timeouts accordingly. However such a solution will generally not be practicable due to the unacceptable overhead caused by the inter-adapter communication.

SUMMARY OF THE INVENTION

It is therefore an object of the invention to provide a time-out management technique which overcomes the disadvantages of the prior art.

According to one aspect of the present invention therefore, there is provided a method for managing devices in a data processing system that includes a plurality of device adapters connected for independent communication with at least one shared device. The method comprises the steps of: issuing a command from a first of the plurality of adapters to the at least one shared device; setting, in the first adapter, first and second timeouts associated with the command; on expiration of the first timeout, issuing a message from said first adapter to other(s) of the plurality of adapters to request the other adapter(s) to notify the first adapter of any work requested of the shared device by the other adapter(s); and on expiration of the second timeout, initiating a recovery operation in the data processing system.

In this way, the problem of erroneous resets described above is avoided by the use of first and second timeouts. On expiry of a first timeout, the system enters a Device Suspicious mode and a message is broadcast to the other adapters connected the shared device to cause each of the other adapter(s) to provide a notification of any work that it (they) initiated at the shared device. If the second timeout expires at the first adapter before receiving any such notification then the first adapter assumes that the device is dead and initiates a recovery action. As will be described below in relation to the preferred embodiment, if notification is received before expiry of the second timeout then the second timeout value is extended. The second timeout may be extended multiple times in response to multiple completion notifications. However an upper limit to the second timeout value will generally be employed in order not to significantly delay a device reset in the event of a device malfunction. As an alternative to extending the second timeout, a third timeout could be set on receipt of each notification.

In the preferred embodiment, the first and second timeouts are set on issuance of the command by the first adapter to the shared device. In an alternative arrangement, the second timeout could be set on expiry of the first timeout.

In the preferred embodiment, the message from the first adapter requests the other adapter(s) to notify the first adapter of the completion of every command that the other adapter(s) have outstanding at the shared device. Thus when the first adapter receives notification from another adapter, it knows that the shared device is still completing work for the other adapter and can therefore extend the second time value in the expectation that the device will subsequently execute the command issued by the first adapter.

In accordance with the preferred embodiment, when the system enters the Device Suspicious mode, the message sent from the first adapter to the other adapter(s) also requests the other adapter(s) to halt sending work to the shared device. The first adapter itself also halts sending work to the shared device. On receipt of the message at each of the other adapter(s), the adapter(s) each issue a Ordered Test Unit Ready command to the shared device. This command joins the command queue at the shared device awaiting execution. When the Ordered Test Unit Ready command reaches the head of the queue, it is executed by the shared device and a completion message is sent to the issuing adapter. Receipt the completion message therefore provides an indication as to when all the outstanding work initiated by the adapter has been completed. At this point, the adapter can restart sending work to the device. Use of the Ordered Test Unit Ready command provides an additional benefit: if the adapter believes that it has work outstanding when it receives a completion message, then it knows that there is a problem with the device itself, with the adapter or with the connecting link. In this case, an appropriate system reset is performed.

In accordance with the preferred embodiment, the values of the first and second timeouts set by the first adapter will vary according to the type of command issued by the first adapter. Thus for a command which normally takes only a few seconds to complete, for example a Disk read command, the first and second timeouts will be relatively short. For a command that normally takes many seconds to complete, for example a device microcode download command, the first and second timeouts will be relatively large.

A preferred feature of the present invention provides additional benefits in the case where the shared device is executing a command from a second adapter that takes a prolonged period to complete, for example a device microcode download. In this scenario, if the first adapter issues a command to the shared device during this prolonged period, then it is possible that the first and second timeouts at the first adapter will expire before the second adapter can provide a notification that its command is complete. To overcome this, when a command is issued from one of the plurality of adapters to the shared device that will cause an operation that takes longer than a predetermined value, the issuing adapter periodically sends false completion notifications to each of the other adapter(s) to prevent expiry of any second timeout value(s) at the other adapter(s).

Viewed from another aspect, the present invention provides a method and apparatus for managing devices in a data processing system that includes a plurality of controllers connected for independent communication with at least one shared device, the at least one shared device maintaining a set, for example a command queue, of commands issued to it by the controllers. In response to a trigger event at a first of the controllers, the first controller sends a request to the other controller(s) to request the other controllers) to provide information regarding work requested of the shared device by the other controllers). The requesting controller employs the received information to build up a picture of the state of the command set at the shared device. This trigger event may be a notification from the shared device that the command queue is full in which case it is advantageous for the controller to acquire information regarding the commands on the queue. The trigger event may instead be the expiration of a timeout (corresponding to the first timeout of the first aspect of the invention) that was set on issuance of an I/O command from the first controller to the shared device.

A preferred embodiment of the invention will now be described, by way of example, with reference to the accompanying drawings.

DESCRIPTION OF THE PREFERRED EMBODIMENT

The invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMs, PROMS, etc., thereby making an article of manufacture according to the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems containing or having network access to computer programming code according to the invention.

Figure 1:
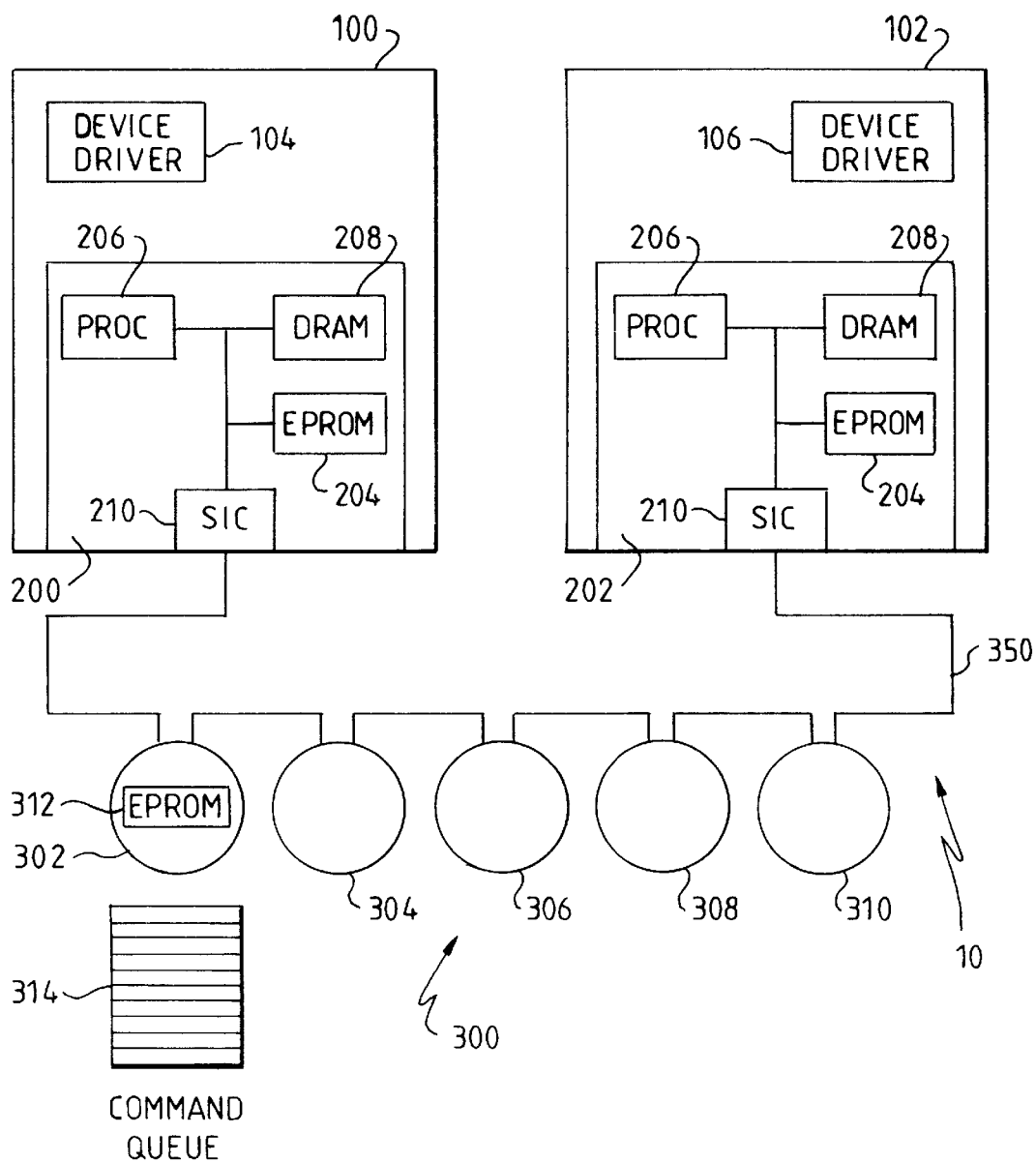
FIG. 1 is a block diagram of a data processing system in which the present invention may be implemented.

With reference first to FIG. 1, there is shown a data processing network 10 comprising two host computer systems (100, 102), having device drivers (104, 106) and device adapters (200, 202). The host computer systems may be personal computers, workstations, mainframes and the like. In accordance with the preferred embodiment, the device adapters take the form of a card which is mounted in a slot within the host system and is logically connected to the host system via a system bus such as a PCI or MCA bus. A suitable device adapter is the IBM SSA RAID Enhanced Adapter. Each device adapter is connected for communication to a storage subsystem 300, comprising a string of disk storage devices 302,304,306,308,310 by means of a serial link 350 which may be configured according to the Serial Storage Architecture (SSA). The disk storage devices are shared between the adapter/host pairs 100/200 and 102/202 such that each host can read or write data to and from each shared device. Each disk drive includes an EPROM 312 in which is stored firmware for controlling operation of the drive. Each drive also includes memory for supporting a command queue (illustrated schematically at 314 in FIG. 1).

Each of the adapters 200 and 202 includes an EPROM 204 for storing adapter microcode which executes on a microprocessor 206 to provide storage subsystem management services (e.g. services to configure the storage devices as an array) for the host system. The adapter further includes memory in the form of DRAM 208 into which the microcode is loaded on initialization of the adapter to give the microprocessor rapid access to the microcode. Communication logic in the form of a Serial Interface Chip (SIC) 210 is provided in each adapter to control communication with the storage devices over the SSA link 350.

In the present embodiment, the host device drivers and adapters communicate by means of a logical client-server network called the Independent Packet Network (IPN). Details of SSA and IPN may be found in the IBM publication PCI SSA RAID Adapters, IBM Publication Number SA33-3225-02, which is hereby incorporated by reference. IPN is a logical network of services. A client, such as a host device driver, can access a service (e.g. in the adapter) by specifying its address in the IPN network, without being concerned where the service is physically located. The unit of work in IPN is a transaction. The routing layer of IPN establishes a connection between the client and the service for the duration of each transaction. An IPN node is a hardware unit that runs the IPN kernel; in the present embodiment, the host systems and adapters are examples of IPN nodes. The adapter provides a number of IPN services including a disk service to give basic read/write access to each attached disk drive and RAID services. Nodes are connected together across hardware interfaces via gateways.

Figure 2:
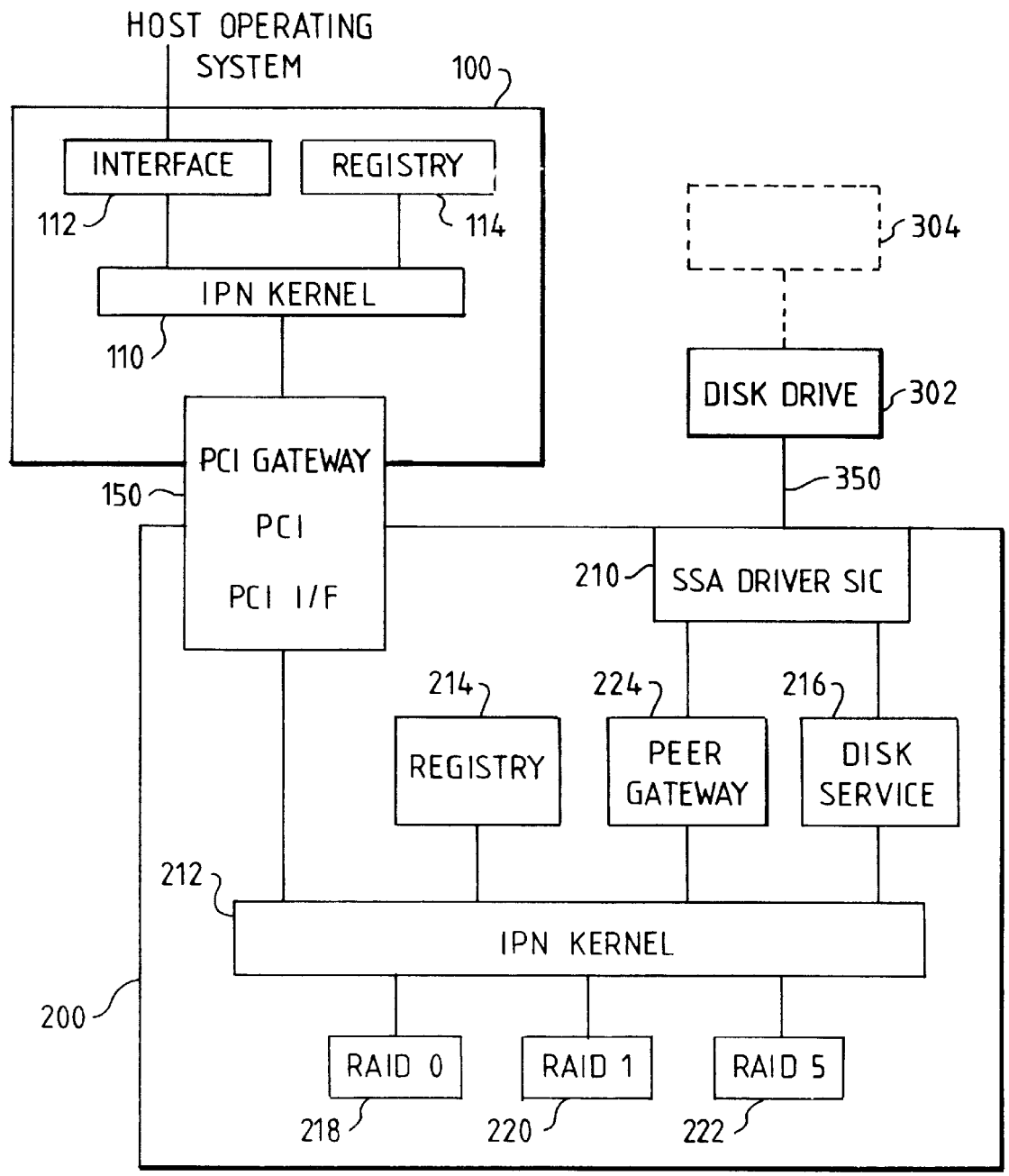
FIG. 2 is a block diagrammatical representation of the adapter logic implementing the present invention.

With reference to FIG. 2, there is shown a schematic representation of the IPN components in one of the host/adapter pairs of FIG. 1. The host 100 includes an IPN kernel 110 and an interface 112 to the host operating system. Also included in the host system is a Registry service 114 which keeps a list of all services running on the host. Connecting the adapter and host system is a Gateway 150 which is used to cross the physical PCI interface.

In the present embodiment, the IPN services are implemented as program code which, as described above, is stored in the EPROM. The adapter 200 includes an IPN kernel 212 and a variety of IPN services including a Registry service 214, which keeps track of all the services running on the adapter, a Disk Service 216 and RAID0 218, RAID1 220 and RAID5 222 services. A Peer Gateway 224 is also provided which is used in the present embodiment to provide communication between the two adapters. Finally, an SSA Driver 210 is provided with the SIC chip to control communication with the disk drives.

The operation of IPN can be understood with reference to the following process steps involved in a typical Transaction to read a non-arrayed disk drive.

1. The host device driver 112 contains a Master process that generates IPN transactions. The Master calls the host IPN kernel 110 with a pointer to a Master Control Block (MCB) for the transaction. The MCB is addressed to the Disk Service 216 in the adapter.
2. The host IPN kernel 110 then calls the PCI Gateway 150 with a pointer to the MCB.
3. The host side of the PCI Gateway creates a Gateway Transaction Control Block (GTCB) in host memory. Each GTCB has a pointer to the next GTCB to form a chain of GTCBS. The PCI Gateway interrupts the adapter when a new GTCB has been set up.
4. The adapter side of the PCI Gateway uses the PCI Interface chip to fetch the GTCB by DMA. The Gateway 150 then creates a Transaction Control Block (TCB) in the adapter address space. Finally the Gateway 150 calls the adapter IPN kernel 212 to submit the TCB.
5. The IPN kernel calls the Disk Service 216 for the addressed device with a pointer to the TCB.
6. The Disk Service 216 generates the appropriate SCSI read command and passes it to the SSA Driver 210.
7. The SSA Driver issues the SCSI command to the disk drive 302 using the SSA protocol and the SIC.
8. The SCSI command is placed on a command queue in the disk drive.
9. When the disk drive offers the requested data, the SSA Driver sets up the SIC 210 to transfer the data directly to the PCI Interface chip (part of 150).
10. When the disk drive returns 'Good completion' status, the Disk Service 216 calls the adapter IPN kernel 212 with the result of the TCB.
11. The IPN kernel 212 calls the adapter side of the PCI Gateway 150. The Gateway uses the PCI Interface chip to DMA a pointer to the GTCB into the adapter outbound delivery pipe, which is located in host memory (not shown). The pointer is tagged to indicate that the GTCB has been completed. Then the Gateway 150 instructs the PCI Interface chip (part of 150) to interrupt the host processor.
12. The host side of the PCI Gateway fetches the pointer and calls the host IPN kernel.
13. The host IPN kernel calls the Master process with the result of the original MCB (this call may be deferred).

A transaction to read from a RAID-5 array is similar to that described above and involves the IPN kernel calling the RAID-5 service which generates IPN transactions for each of the disk drives and sends these transactions to the Disk Service using the IPN kernel.

In the present embodiment, each host system can initiate Transactions for processing as described above. Thus, during operation, each adapter sends multiple SCSI commands (which may be I/O or other commands) to each shared disk drive. The SCSI commands are enqueued in the disk drive memory for processing. As has been described above, prior multi-adapter arrangements of this type can lead to erroneous system resets in the event that an adapter times out while waiting for completion of a command.

Figure 3:
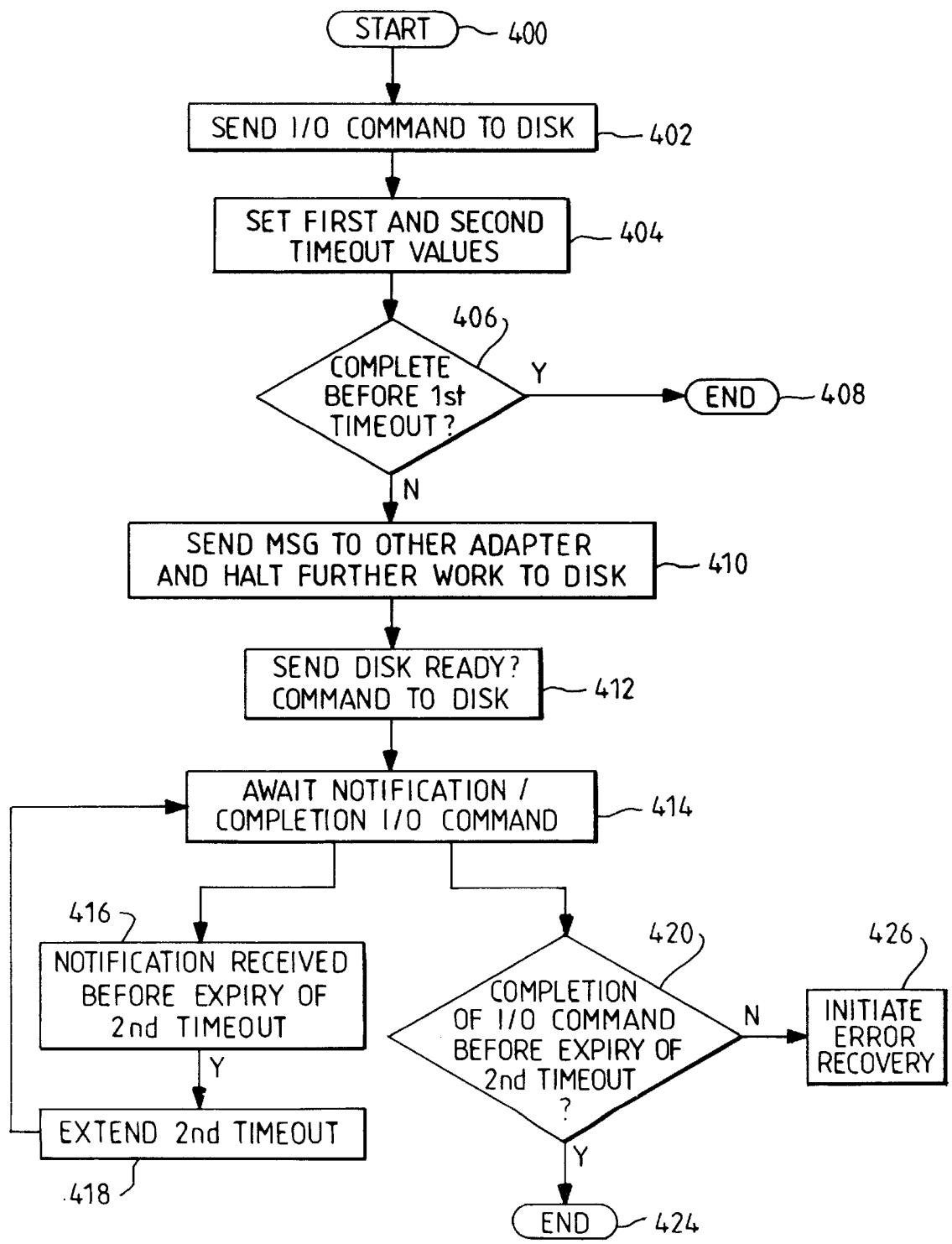
FIG. 3 is a flow chart showing the process steps of the timeout management process according to the present invention.

The solution provided by the present embodiment will now be described with reference to the process steps shown in the flow chart of FIG. 3. The operation starts at step 400. At step 402, adapter 100 sends a SCSI Read command to one of the disk drives in the manner described above. This command is enqueued at the disk drive for later execution. At step 404, the Disk Service sets a first timeout and a second timeout associated with the issued command, the value of the second timeout being greater than that of the first. Generally speaking, the values used will depend on a number of factors including the type of command, the number of adapters sharing the device etc. In the present example, the first timeout value may be 10 seconds and the second timeout value may be 30 seconds. For other commands such as a disk microcode download, which takes a significant amount of time to complete, the first value may be 70 seconds and the second timeout value may be 90 seconds.

As indicated at step 406, the Disk Service waits for Good Completion of the command (in actual fact, the Disk Service will, in the meantime, be generating more SCSI commands and receiving status from other completed commands). If, at step 406, completion for the command issued at step 402 is received prior to expiry of the first timeout value, then there is no problem and the process ends at step 408. If however, the first timeout expires before Good Completion Status is received, then adapter 100 enters 'Device Suspicious' mode. This mode is manifested by the Disk Service calling the IPN kernel to cause the Peer Gateway to send, at step 410, a message over the serial link to the other adapter 102. This message requests adapter 102 to stop sending commands to the device specified in the message and furthermore requests adapter 102 to notify adapter 100 when any outstanding commands complete. On receipt of the message at adapter 102, the adapter 102 halts sending any further commands to the identified disk and instead sends a Ordered Test Unit Ready command to the disk 101, which is added to the command queue. This Ordered Test Unit Ready command acts in effect like a marker that identifies the last command sent by adapter 102 and should therefore be the last of that adapter's commands processed in the disk storage device. In the meantime adapter 100 also sends (step 412) a Ordered Test Unit Ready command to the identified device.

At this point, the second timeout is still running and the adapter 100 is awaiting either a Good Completion for the command issued at step 402 or notification from adapter 102 (by means of the Peer Gateway) that a command sent by that adapter has completed. If a notification is received before expiry of the second timeout (step 416), the second timeout extended, for example by 10 seconds, by the Disk Service at step 418. It will be noted that the second timeout may be extended a number of times pending completion of the outstanding command. Although the second timeout could be extended indefinitely, it will generally be more practicable to set an upper limit on the total second timeout value which cannot be extended, and expiry of which will give rise to a disk reset.

If, at step 420, completion is received before expiry of the second timeout, then there is no problem and the adapter 100 awaits completion of the Ordered Test Unit Ready command (step 422). When this is received, the adapter 100 restarts issuing commands to the device (step 424). If completion of the original command is not received before expiry of the second (possibly extended) timeout, then a disk reset operation is performed at step 426.

In this way, a disk reset operation is performed only if there is a high likelihood that there is a disk malfunction. If adapter 102 does not have any outstanding commands at the disk, then there should be no delay in the disk completing commands issued by the adapter 100. If adapter 102 does have outstanding commands at the disk, and the disk is operating normally, then it periodically sends completion messages, as requested, to the adapter 100. The receipt of these notifications extends the time before the adapter initiates a disk reset.

The Ordered Test Unit Ready command described above is used to define the end of the Device Suspicious mode. When an adapter receives a completion of this command it knows that it has no outstanding work at the disk and uses this as the trigger to restart sending commands. The Ordered Test Unit Ready command serves an additional purpose: if the adapter receives completion of the Ordered Test Unit Ready command before it expects to (that is the adapter thinks that it has other commands outstanding), then there is obviously something amiss with the link between the adapter and the disk, or something amiss with the disk itself. A system reset can then be initiated.

An additional feature of the present embodiment provides benefits in the case where the shared disk is executing a command from adapter 100 that takes a prolonged period to complete, for example microcode download, which may take 70 seconds. In this scenario, if adapter 102 issues an I/O command to the shared disk during this prolonged period, which I/O command has first and second timeouts of 10 and 30 seconds respectively, then it is likely that the first and second timeouts at adapter 102 will expire before adapter 100 is in a position to provide a notification that its disk microcode download command is complete.

Figure 4:
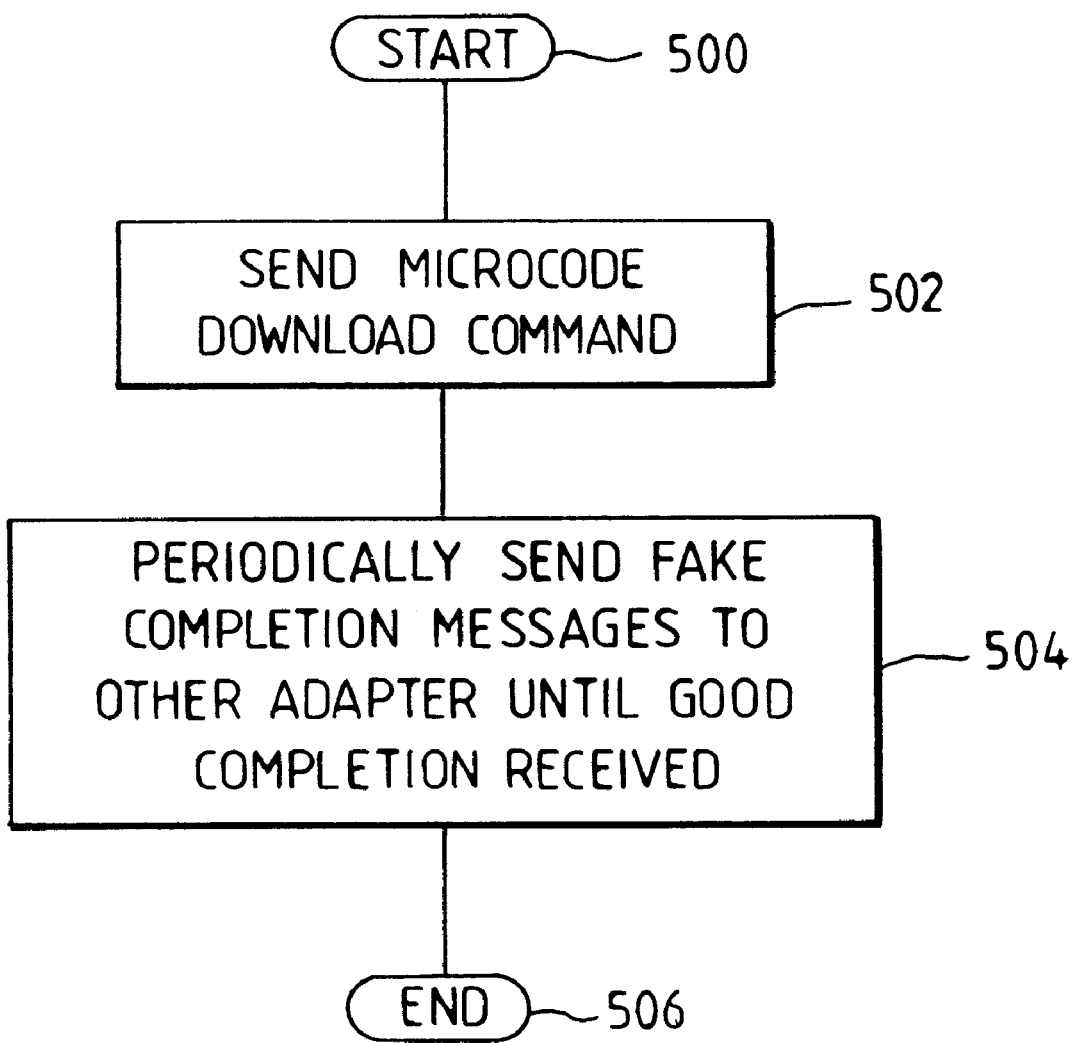
FIG. 4 is a flow chart showing the sending of fake completion messages according to one preferred feature of the present invention.

The solution provided by the present embodiment is illustrated in FIG. 4 which starts at step 500. At step 502, the adapter 100 sends a microcode download command to the shared disk. Subsequently, at step 504, on receipt by adapter 100 of a message from adapter 102 requesting notification of completions, the adapter 100 periodically sends fake completion notifications to adapter 102 until such time as actual completion of the microcode download is received. The sending of fake notifications acts to prevent expiry of the second timeout at the adapter 102 thus avoiding a catastrophic disk reset. The timing of the fake completion notifications will be system dependent but should be less than the time by which the second timeouts are extended in the receiving adapter.

When viewing the invention from another aspect, the expiration of the first timeout can be considered as a trigger event which causes the adapter to send a message to the other adapter(s) requesting them to provide information regarding work requested of the shared device by the other adapter(s). The sharing of information between adapters in this way can be useful in other scenarios. For example, the trigger event may be a notification from the shared device that the command queue maintained by the device is full. In this case, the adapter sends a request to the other adapter(s) for a list of commands each of them has outstanding at the shared device and also a request to subsequently send any updates to that list. The requesting adapter then employs the information received from the other adapters to build up a picture of the state of the command set at the shared device. It will be noted that by making the sharing of the information between the adapters conditional on a trigger event, the excessive overhead inherent in the continuous sharing of information between adapters is avoided.

Although the present invention has been described in accordance with the embodiment shown, one of ordinary skill in the art will readily recognize that there could be variations to the embodiment and those variations would be within the spirit and scope of the present invention as defined by the appended claims. In particular, although the present invention has been described in the context of the SSA architecture, it will be apparent that the invention may be used in other environments such as Fiber Channel. Furthermore although a two adapter arrangement has been described in the embodiment, it will be apparent that the invention is equally applicable to arrangements where more than two adapters share the same device(s).

Accordingly, it is to be understood that the invention disclosed herein is not to be limited by the illustrated embodiment, but only by the scope of the appended claims.

What is claimed is:

1. A method for managing devices in a data processing system that includes a plurality of device adapters connected for independent communication with at least one shared device, the method comprising the steps of:

issuing a command from a first of the plurality of adapters to the at least one shared device;

setting, in the first adapter, first and second timeouts associated with the command;

on expiration of the first timeout, issuing a message from the first adapter to other(s) of the plurality of adapters to request the other adapter(s) to notify the first adapter of any work requested of the shared device by the other adapter(s); and on expiration of the second timeout, initiating a recovery operation in the data processing system.

2. The method of claim 1 wherein the first and second timeouts are set on issuance of the command by the first adapter to the shared device.

3. The method of claim 1 wherein the message from the first adapter requests the other adapter(s) to notify the first adapter of the completion of every command that the other adapter(s) have outstanding at the shared device.

4. The method of claim 1, comprising the further step of:

on receipt of a notification from one of the other adapter (s) prior to expiry of the second timeout value, extending the second timeout value.

5. The method of claim 1, wherein the message sent from the first adapter to the other adapter(s) also requests the other adapter(s) to halt sending work to the shared device.

6. The method of claim 5, comprising the further step of:

on receipt of the message at each of the other adapter(s), issuing a command from each of the other adapter(s) to the shared device which when completed by the shared device provides an indication to each of the issuing adapter(s) that all the outstanding work initiated at the shared device by that adapter has completed.

7. The method of claim 1 wherein the first and second timeouts set by the first adapter vary according to the type of command issued by the first adapter.

8. The method of claim 2, comprising the further steps of:
issuing a command from one of the plurality of adapters to the shared device to cause an operation that takes longer than a predetermined value;
periodically sending a false completion notification to each of the other adapter(s) to prevent expiry of any second timeout(s) at the other adapter(s).

9. The method of claim 1 wherein the step of initiating a recovery action comprises resetting the shared device.

10. The method of claim 1 wherein each of the plurality of adapters is a storage adapter and the at least one shared device is a mass data storage device of a plurality of data storage devices.

11. The method of claim 8, wherein the device is a data storage device and the command issued by the second adapter is a data storage device microcode download command.

12. A device adapter for use in a data processing system including a plurality of device adapters connected for independent communication with at least one shared device, the device adapter including:
means for issuing a command to the at least one shared device;
means for setting first and second timeouts associated with the command;
means, operable on expiration of the first timeout, to issue a message to each of other(s) of the plurality of adapters to request the other adapter(s) to notify the device adapter of any work requested of the shared device by the other adapter(s); and
means, operable on expiration of the second timeout, to initiate a recovery operation in the data processing system.

13. The adapter of claim 12 wherein the first and second timeouts are set on issuance of the command to the shared device.

14. The adapter of claim 12 wherein the message requests the other adapter(s) to notify the adapter of the completion of every command that the other adapter(s) have outstanding at the shared device.

15. The adapter of claim 12, further including:
means, operable on receipt of a notification from one of the other adapter(s) prior to expiry of the second timeout value, to extend the second timeout value.

16. The adapter of claim 12, wherein the message to the other adapter(s) also requests the other adapter(s) to halt sending work to the shared device.

17. The adapter of claim 12, wherein the means for issuing a command to the shared device is operable on expiration of the first timeout to issue a further command to the shared device which when completed by the shared device provides an indication that all the outstanding work initiated at the shared device by the adapter has completed.

18. The adapter of claim 12 wherein the first and second timeouts vary according to the type of command issued by the adapter.

19. The adapter of claim 12, further including means, operable on the issuance of a command to the shared device that causes an operation to take longer than a predetermined value, to periodically send a false completion notification to each of the other adapter(s) to prevent expiry of any second timeout(s) at the other adapter(s).

20. The adapter of claim 19 wherein the command that causes an operation to take longer than a predetermined value is a data storage device microcode download command.

21. The adapter of claim 12 wherein the means for initiating a recovery action in the data processing system is operable to send a reset command to the shared device.

22. A data processing system including a plurality of device adapters connected for independent communication with at least one shared device, each of said adapters further comprising:
means for issuing a command to the at least one shared device;
means for setting first and second timeouts associated with the command;
means, operable on expiration of the first timeout, to issue a message to each of other(s) of the plurality of adapters to request the other adapter(s) to notify the device adapter of any work requested of the shared device by the other adapter(s); and
means, operable on expiration of the second timeout, to initiate a recovery operation in the data processing system.

23. The data processing system of claim 22 wherein each of the plurality of device adapters is a storage adapter connected for communication with second plurality of shared data storage devices.

24. A computer program product comprising a computer readable medium having tangibly embodied thereon computer program code means for managing devices in a data processing system including a plurality of device adapters connected for independent communication with at least one shared device, the computer program code means including:
computer program code means, executable on a device adapter, for issuing a command to the at least one shared device;
computer program code means, executable on the device adapter, for setting first and second timeouts associated with the command;
computer program code means, executable on the device adapter, that is operable on expiration of the first timeout, to issue a message to each of other(s) of the plurality of adapters to request the other adapter(s) to notify the device adapter of any work requested of the shared device by the other adapter(s); and
computer program code means, executable on the device adapter, that is operable on expiration of the second timeout, to initiate a recovery operation in the data processing system.

25. The computer program product of claim 24 wherein the first and second timeouts are set on issuance of the command to the shared device.

26. The computer program product of claim 24 wherein the message requests the other adapter(s) to notify the adapter on which the computer program code is executable of the completion of every command that the other adapter (s) have outstanding at the shared device.

27. The computer program product of claim 24, further including:
computer program code means, executable on the device adapter, that is operable on receipt of a notification from one of the other adapter(s) prior to expiry of the second timeout, to extend the second timeout.

28. The computer program product of claim 24, wherein the message to the other adapter(s) also requests the other adapter(s) to halt sending work to the shared device.

29. The computer program product of claim 24, further including computer program code means executable on the device adapter that is operable on expiration of the first timeout to issue a further command to the shared device which when completed by the shared device provides an indication that all the outstanding work initiated at the shared device by the adapter has completed.

30. The computer program product of claim 24 wherein the first and second timeouts are set according to the type of issued command.

31. The computer program product of claim 24, further including computer program code means, executable on the device adapter that is operable on the issuance of a command to the shared device that causes an operation to take longer than a predetermined value, to periodically send a false completion notification to each of the other adapter(s) to prevent expiry of any second timeout(s) at the other adapter(s).

32. The computer program product of claim 31 wherein the command that causes an operation to take longer than a predetermined value is a data storage device microcode download command.

33. The computer program product of claim 24 wherein the computer program code means for initiating a recovery action in the data processing system is operable to send a reset command to the shared device.

34. A method for managing devices in a data processing system that includes a plurality of controllers connected for independent communication with at least one shared device, the at least one shared device maintaining a command set of commands issued to it by the controllers, the method comprising the steps of:

in response to a trigger event at a first of the controllers, sending a message from the first controller to the other controller(s) to request the other controller(s) to provide information regarding work requested of the shared device by the other controller(s) thereby to provide the requesting controller with knowledge of the state of the command set at the shared device beyond knowledge of whether the state of the other controller(s) indicates that the other controller(s) is merely alive.

35. A method as claimed in claim 34 wherein the trigger event is the expiration of a timeout that was set on issuance of an I/O command from the first controller to the shared device.

* * * * *

UNITED STATES PATENT AND TRADEMARK OFFICE
CERTIFICATE OF CORRECTION

PATENT NO.    : 6,484,217 B1
DATED         : November 19, 2002
INVENTOR(S)   : Fuente et al.

It is certified that error appears in the above-identified patent and that said Letters Patent is hereby corrected as shown below:

Column 1,
Line 24, "disk are" should read -- disk drives are --.
Line 34, "in, which" should read -- in which --.
Line 48, "thee" should read -- the --.
Line 65, "However such" should read -- However, such --.

Column 2,
Line 24, "connected the" should read -- connect to the --.
Line 27, "notification" should read -- notification, --.
Line 31, "timeout then" should read -- timeout, then --.
Line 34, "However an" should read -- However, an --.
Line 63, "Receipt" should read -- Receipt of --.

Column 3,
Lines 39 and 41, "controllers)" should read -- controller(s) --.

Column 4,
Line 7, "PROMS" should read -- PROMs --.

Column 5,
Line 28, "driver 112 contains" should read -- driver contains --.

Column 6,
Line 57, "disk 101," should read -- disk, --.

UNITED STATES PATENT AND TRADEMARK OFFICE
CERTIFICATE OF CORRECTION

PATENT NO. : 6,484,217 B1
DATED : November 19, 2002
INVENTOR(S) : Fuente et al.

It is certified that error appears in the above-identified patent and that said Letters Patent is hereby corrected as shown below:

<u>Column 7,</u>
Line 2, "the second timeout" should read -- the second timeout is --.
Line 14, "(step 422)" should be omitted from the text.
Line 15, "(step 424)" should be omitted from the text.

Signed and Sealed this

Seventh Day of October, 2003

JAMES E. ROGAN
*Director of the United States Patent and Trademark Office*